Aug. 28, 1956
H. A. ROBINSON
2,761,065
FREQUENCY CONTROL SYSTEM
Filed May 27, 1953
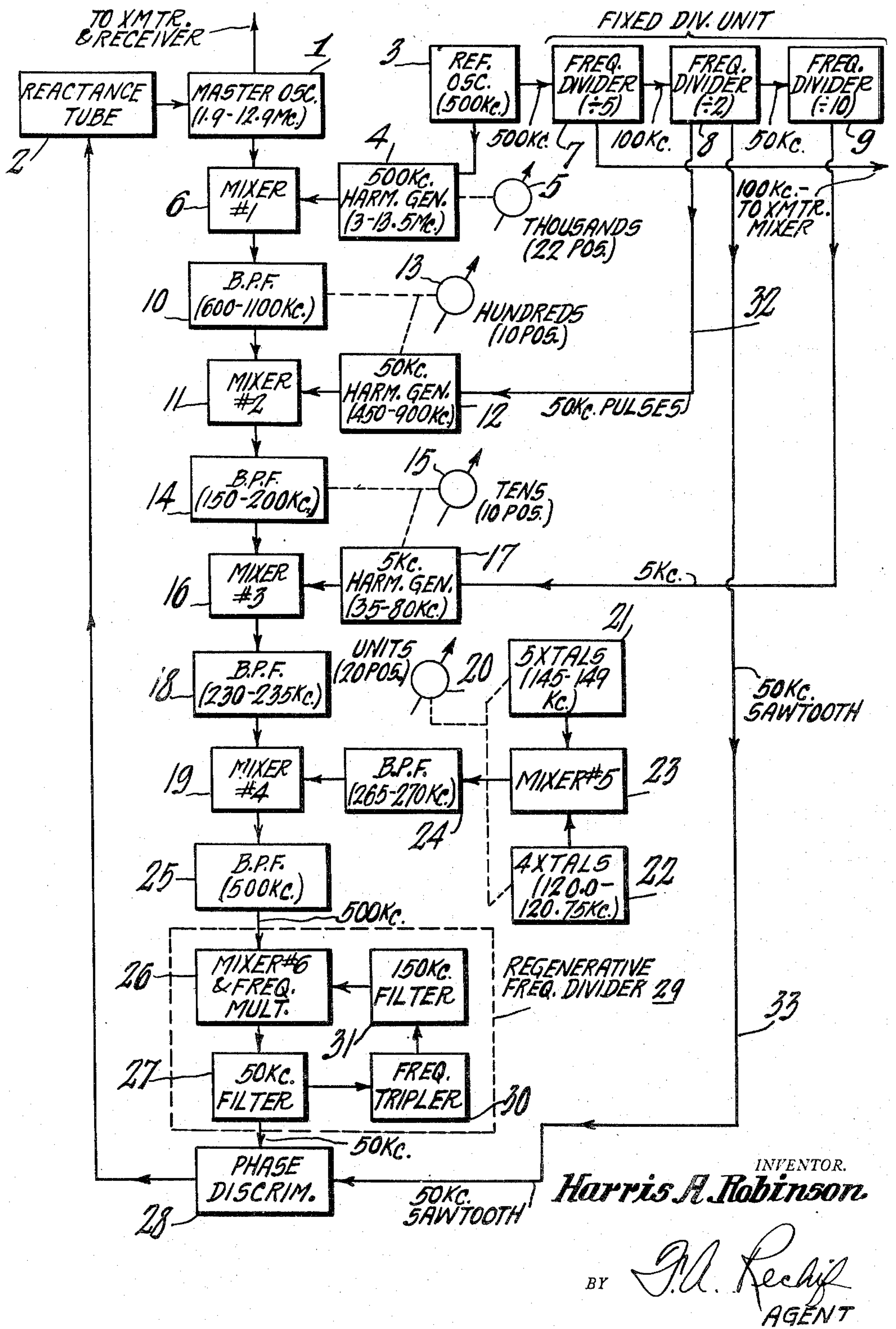
INVENTOR.
Harris A. Robinson
BY G. A. Rechif
AGENT United States Patent Office 2,761,065

Patented Aug. 28, 1956

2,761,065

FREQUENCY CONTROL SYSTEM

Harris A. Robinson, Philadelphia, Pa., assignor, by mesne assignments, to the United States of America as represented by the Secretary of the Air Force Application May 27, 1953, Serial No. 357,718

1 Claim. (Cl. 250—36)

This invention relates to frequency control systems, and more particularly to the stabilization of systems of this kind with respect to spurious signals and disturbances of various types.

This invention is related to that disclosed in my copending application, Serial No. 257,148, filed November 19, 1951. In said application, a multi-channel frequency generator is disclosed, this generator providing 44,000 fre-frequency channels for a master oscillator which is automatically tuned and stabilized in frequency. In the control and stabilization system for this master oscillator, harmonic generators (supplied from a crystal-stabilized oscillatory source) are utilized, the outputs of these harmonic generators being fed to cascaded mixers to the first of which the master oscillator frequency is supplied. The output of the final mixer is coupled to a phase discriminator where it is compared with a stable reference frequency. The phase discriminator output is, in turn, applied to a reactance tube for controlling the frequency of the master oscillator.

It was found that in control systems of this type, utilizing harmonic generators and mixers, spurious frequency components arose in the mixers, resulting from the several harmonic generator inputs and the non-linearity of the mixers. These spurious components represent a modulation, both amplitude and phase, on the signal supplied to the phase discriminator. The control voltage from the phase discriminator (since in such discriminator the output of the final mixer is compared to a crystal-stabilized frequency) contains these spurious components, which are passed on to the reactance tube, resulting in a spurious frequency modulation of the master oscillator. This spurious modulation of the master oscillator is undesirable, since it results in adverse effects on the frequency stability of such oscillator.

An object of this invention is to reduce the spurious modulation normally arising in a certain type of frequency control system.

Another object is to reduce the spurious modulation arising in a frequency control system using harmonic generators and mixers, to a degree such that it does not produce an unacceptable effect on the frequency stability of the controlled master oscillator.

The objects of this invention are accomplished, briefly, in the following manner: A frequency divider is added to the frequency control system at a location between the final harmonic-generator-supplied mixer or heterodyning stage and the phase discriminator, to reduce the equivalent modulation index of the spurious modulation in proportion to the division ratio of such divider, and hence to greatly reduce the spurious sideband components produced by the controlled master oscillator.

The foregoing and other objects of this invention will be best understood from the following description of an exemplification thereof, reference being had to the accompanying drawing, wherein the single figure is a block diagram of a system according to this invention.

Referring now to the drawing, the master oscillator 1 is the oscillator that is automatically controlled in frequency by the frequency control system illustrated, and the output of this oscillator is utilized in the transmitter-receiver (not shown) with which the system illustrated is associated. The transmitter-receiver may for example be arranged as disclosed in my copending application Serial No. 257,148. The master oscillator 1 is arranged to be permeability tuned and has an output frequency of 1.9 to 12.9 mc. (in several bands), as indicated. Exact frequency control of oscillator 1 is obtained by means of reactance tube 2 coupled to oscillator 1.

As previously stated, the frequency control system of this invention utilizes harmonic generators excited from a crystal-stabilized oscillatory source. The heart of the unit which acts as the oscillatory source is a 500-kc. reference crystal-controlled oscillator 3 which is extremely stable. Output of 500 kc. from reference oscillator 3 drives a 500-kc. harmonic generator 4. Generator 4 is preferably of the two-stage type described and claimed in my copending application, Serial No. 253,141, filed October 25, 1951. A "Thousands" selection switch 5 has twenty-two positions and is mechanically coupled to a frequency selecting means in generator 4 so that any selected one of the 6th through 27th harmonics of the 500-kc. input to generator 4 may be passed from said generator to #1 mixer 6, depending upon the position of switch 5. Output from the master oscillator 1 is also supplied to mixer 6 and this oscillator frequency, beating with the output frequency of generator 4 in such mixer, produces a difference frequency mixer output which may vary from 600 to 1100 kc., depending upon the frequency selection switch settings.

The 500-kc. output of oscillator 3 drives a series of cascaded locked-in oscillator frequency dividers, beginning with a 100-kc. locked-in oscillator 7 the output of which drives a 50-kc. stage 8 whose output, in turn, drives a 5-kc. stage 9. The 50-kc. stage 8 includes amplifier and pulse shaper circuits whereby 50-kc. pulses and a 50-kc. sawtooth wave may be derived from this stage for utilization in circuits to be later described.

The 600-1100 kc. difference frequency output of mixer 6 is passed through a bandpass filter 10 to provide one of the inputs to #2 mixer 11, the other input being provided from a 50-kc. harmonic generator 12. The generator 12 is supplied with 50-kc. pulse input derived from divider stage 8 over lead 32 and harmonics of this input frequency lying in the range of 450 to 900 kc. are selected by the "Hundreds" selection switch 13, which has ten positions. The particular harmonic of 50 kc. selected at the output of generator 12 depends of course upon the position of switch 13, and this selected harmonic is passed on to mixer 11 as input to mix with signal from filter 10. The selective circuit in filter 10 is tuned approximately by the "Hundreds" switch 13.

Output from mixer 11 is transferred, through the selective circuit bandpass filter 14, tunable in ten steps between 150 and 200 kc. as the "Tens" switch 15 (which has ten positions) determines, to #3 mixer 16. A 5-kc. harmonic generator 17 is supplied with 5-kc. input derived from divider stage 9 and harmonics of this input frequency lying in the range of 35 to 80 kc. are selected by the "Tens" switch 15. The particular harmonic of 5 kc. which is selected by switch 15 from generator 17, is passed on to mixer 16 as input to mix with signal from filter 14.

Output from mixer 16 is transferred through the bandpass filter 18, which passes a frequency band from 230 to 235 kc., to #4 mixer 19. The "Units" switch 20, which has twenty positions, selects crystals in crystal oscillator units 21 and 22. One of the group of four crystals from 120.0 to 120.75 kc., in oscillator 22 is selected, while one of the group of five crystals from 145 to 149 kc. in oscillator 21 is selected. The crystals in oscillator 22 have frequencies of 120.0, 120.25, 120.5 and 120.75 kc. while those in oscillator 21 have frequencies of 145, 146, 147, 148 and 149 kc. The outputs of the two crystal oscillators 21 and 22 excite #5 mixer 23, the switching actuated by "Units" switch 20 being arranged to produce output from mixer 23 of any one of twenty frequencies, spaced ever 250 cycles in the range from 265 to 269.75 kc. A bandpass filter 24 couples this mixed crystal output to #4 mixer 19.

The output of #4 mixer 19 is nominally 500 kc. In other words, as the master oscillator 1 is scanned through a band of frequencies there will be one segment of the oscillator tuning range, corresponding to the settings of the switches 5, 13, 15 and 20 (which determine the selected frequencies fed to the several mixers) where a signal near 500 kc. will be developed in the output of mixer 19; this signal output in the vicinity of 500 kc. corresponds closely to the desired correct tuning of the master oscillator 1. A specific numerical example will make this clearer. Suppose that the master oscillator frequency is 3,462.5 kc. Then, the 9th harmonic of 500 kc. is selected in harmonic generator 4 and this 4500-kc. frequency combines in mixer 6 with the 3,462.5-kc. output of the master oscillator 1, giving a difference frequency of 1037.5 kc. which is passed through filter 10 to mixer 11. The 17th harmonic of 50 kc., which is 850 kc., is selected from harmonic generator 12 and this frequency combines with the 1037.5-kc. frequency in mixer 11 to give a difference frequency of 187.5 kc. which is passed through filter 14 to mixer 16. The 9th harmonic of 5 kc., which is 45 kc., is selected in harmonic generator 17 and this frequency combines with the 187.5-kc. frequency in mixer 16 to give a sum frequency of 232.5 kc. which is passed through filter 18 to mixer 19. In the oscillator 22, a frequency of 120.5 kc. is selected, while in the oscillator 21 a frequency of 147 kc. is selected. These latter two frequencies are mixed in mixer 23 to give a sum frequency of 267.5 kc. which is passed through filter 24 to mixer 19. This 267.5-kc. frequency combines with the 232.5-kc. frequency in mixer 19 to give a sum frequency of 500.0 kc. which is passed through a selective filter 25 (tuned to 500 kc.) to a mixer 26, in the latter to be divided down, in effect, to 50 kc., for example, which passes through a filter 27 to a phase discriminator 28. The mixer 26 constitutes part of a regenerative frequency divider 29 (indicated by the dotted-line enclosure which is so labeled) which is located between the output of filter 25 and phase discriminator 28.

The harmonic generator-mixer arrangement described is exactly the same as disclosed in my said prior copending application, Serial No. 257,148. The arrangement described constitutes a multi-channel frequency generator, providing 44,000 frequency channels for the master oscilaltor 1, one channel every 250 cycles in the range extending from 1.9 mc. to 12.9 mc. Each frequency channel is selected by the setting of the four switches 5, 13, 15 and 20.

The 50-kc. output of filter 27 is coupled as one input to phase discriminator 28, preferably through an amplifier and phase inverter arrangement (not shown). A 50-kc. sawtooth-shaped output derived from divider stage 8 over lead 33 is supplied as the other input to phase discriminator 28. In the phase detector or discriminator 28 a direct current control output results from the phase comparison of the 50-kc. signal from filter 27 and the 50-kc. sawtooth signal derived from the reference 50-kc. source 8. The control output of the phase discriminator is direct coupled (preferably through a cathode follower stage, not shown) to the grid of the reactance tube 2 for the master oscillator 1, in order to correct for slow frequency drifts of the master oscillator 1.

The foregoing constitutes an automatic frequency control system for the master oscillator 1, by means of which the master oscillator is stabilized in frequency by a phase discriminator 28 which compares the heterodyned output of oscilaltor 1 (heterodyned through mixers 6, 11, 16, 19 and 26) with the divided output of the reference crystal oscillator 3 (divided through dividers 7 and 8).

The frequency control and frequency generation system utilizes a series of harmonic generators and mixers as described, in order to minimize the number of crystals, tubes and associated circuit elements. Spurious frequency components can and do arise in the various mixers 6, 11 and 16, as a result of various frequency combinations in the several harmonic generator-mixer circuits. In other words, spurious frequency components inherently arise in the mixers, from the several harmonic generators 4, 12 and 17.

Let us first assume that the regenerative frequency divider 29 is not used, so that the 500-kc. output of filter 25 is fed directly to phase discriminator 28. Then, the spurious frequency components arising in the mixers result in modulation, both amplitude and frequency (or phase) of the signal (derived from master oscillator 1) supplied to the phase discriminator 28. Due to the action of the phase discriminator, the control voltage therefrom contains these spurious modulation components, which are passed on to the reactance tube 2, resulting in spurious frequency modulation of the master oscillator 1. This causes instability of the master oscillator, sufficient in most instances to render the same undesirable for C. W. communication as required.

According to the present invention, a frequency divider 29 is utilized preceding the phase discriminator 28, and more specifically between the output of filter 25 and such discriminator, resulting in a major improvement in the frequency stability of the master oscillator. In other words, the 500-kc. output of filter 25 is divided in frequency by divider 29 (in the case illustrated the frequency division ratio is ten) before being applied to discriminator 28; this means that the 500-kc. output of filter 25 is divided down to 50 kc. before application to the discriminator. Due to this frequency division, the spurious FM arising from the harmonic generators and mixers (and present in the output of filter 25) has its equivalent modulation index reduced in proportion to the frequency division ratio. As is well known to those skilled in the art, the modulation index of an FM wave is the ratio of the peak deviation frequency to the audio modulating frequency, and this index is reduced by dividing the frequency of the FM wave. The modulation index of the spurious FM being thus reduced, the number of effective spurious sideband pairs is also greatly reduced, since the number of effective sideband components varies in the same direction as the modulation index. Therefore, as compared to the case first assumed (i. e., when a frequency divider is not utilized), although the spurious frequency components arising in the mixers may result in some FM of the signal supplied to phase discriminator 28, still, due to the great reduction in the modulation index (and also in the number of effective sideband components) of the FM wave, the extent of, and the effectiveness of, the spurious FM applied by way of reactance tube 2 to master oscillator 1 are so very greatly reduced that this spurious FM of the oscillator is not at all bothersome as regards the frequency stability of the master oscillator. In fact, by utilizing frequency division in the manner disclosed, any spurious FM of the master oscillator is reduced to a degree which is adequate to achieve an entirely acceptable frequency purity and stability.

The use of frequency division prior to the phase comparator or phase discriminator 28 serves equally well to improve the frequency stability of the master oscillator when the equipment is subjected to mechanical shock and/or vibratory disturbances which result in severe transient frequency disturbances or FM of the master oscillator, since the modulation index of the resultant FM is reduced proportionately by the frequency divider.

The frequency division before phase comparison causes the phase comparison to take place at 50 kc. per second, rather than at 500 kc. per second (as it would if no divider were used). This means that the equivalent time length of the useful portion of the phase discriminator characteristic has been proportionately increased according to this invention (for example, by a factor of ten, as described), further improving the frequency stability under transient mechanical or electrical disturbances.

A division ratio of ten has been found to be very effective for accomplishing the objects of this invention, although further improvement in the frequency stability of the master oscillator was obtained with a higher division ratio (40:1).

The frequency divider 29 is illustrated as being of the regenerative type. The 500-kc. output from filter 25 is coupled to the regenerative frequency divider 29, comprising #6 mixer 26 the output of which is fed to a 50-kc. filter or output tank 27, the divider also including a frequency tripler 30 which receives output from filter 27 and also a 150-kc. filter or tank 31 which receives output from tripler 30 and transfers its output signal to the input side of mixer 26, which also functions as a frequency multiplier to multiply the 150-kc. signal received from filter 31 to a frequency of 450 kc. to beat with the 500-kc. signal received from filter 25, thereby producing the 50 kc. required for filter 27. This regenerative frequency divider operates, in effect, to divide the 500-kc. signal at the output of filter 25 down to a frequency of 50 kc. at the output of filter 27. This provides a frequency division ratio of ten.

While a regenerative-type frequency divider has been illustrated, other types of frequency dividers are equally effective in reducing the modulation index of the spurious FM components. For example, a binary-type divider has been tested, with equally good results.

What is claimed is:

In a frequency control system, a source of stable frequency waves, a plurality of harmonic frequency generators each excited by stable frequency waves derived from said source, a plurality of cascaded mixers equal in number to the number of said generators, means coupling the output of each of said generators to a respective one of said mixers, an oscillator the frequency of which is to be controlled, means coupling the output of said oscillator to the first of said mixers, frequency converting means coupled to the output of the final one of said mixers for converting said last-named output to a fixed predetermined frequency different from the final mixer output frequency, frequency dividing means having a fixed predetermined division ratio, means coupling the fixed frequency output of said converting means to the input of said dividing means, a phase discriminator having two input connections and an output connection, means coupling the output of said dividing means to one input of said discriminator, means coupling waves of stable frequency derived from said source to the other input of said discriminator, and means coupled to the output of said discriminator for controlling the oscillator frequency.

References Cited in the file of this patent

UNITED STATES PATENTS

| | | |
|---|---|---|
| 2,250,104 | Morrison | July 22, 1941 |
| 2,340,432 | Schock | Feb. 1, 1944 |
| 2,581,594 | MacSorley | Jan. 8, 1952 |
| 2,595,608 | Robinson | May 6, 1952 |
| 2,685,032 | Cox | July 27, 1954 |